(12) United States Patent
Ingels et al.

(10) Patent No.: US 8,712,558 B2
(45) Date of Patent: Apr. 29, 2014

(54) DATA CENTER MANAGEMENT UNIT WITH IMPROVED DISASTER PREVENTION AND RECOVERY

(75) Inventors: Wilbert Ingels, Ternat (BE); Niko Vinken, Anzegem (BE)

(73) Assignee: Racktivity NV, Lochristi (BE)

( * ) Notice: Subject to any disclaimer, the term of this patent is extended or adjusted under 35 U.S.C. 154(b) by 409 days.

(21) Appl. No.: 13/139,291

(22) PCT Filed: Aug. 12, 2010

(86) PCT No.: PCT/EP2010/004936
§ 371 (c)(1),
(2), (4) Date: Jun. 10, 2011

(87) PCT Pub. No.: WO2011/066875
PCT Pub. Date: Jun. 9, 2011

(65) Prior Publication Data
US 2011/0320834 A1    Dec. 29, 2011

(30) Foreign Application Priority Data

Dec. 3, 2009  (EP) .................................... 09075537

(51) Int. Cl.
*G05B 11/01* (2006.01)
(52) U.S. Cl.
USPC ........................................... 700/22; 700/295
(58) Field of Classification Search
None
See application file for complete search history.

(56) References Cited

U.S. PATENT DOCUMENTS

| | | | | |
|---|---|---|---|---|
| 3,581,014 A * | 5/1971 | Vogel et al. | ..................... | 369/21 |
| 4,611,289 A * | 9/1986 | Coppola | ...................... | 713/300 |
| 6,049,143 A * | 4/2000 | Simpson et al. | .............. | 307/126 |
| 6,557,170 B1 * | 4/2003 | Wilder et al. | ................. | 725/130 |
| 6,987,389 B1 * | 1/2006 | Macbeth et al. | .............. | 324/536 |
| 2005/0052814 A1 * | 3/2005 | McNally et al. | .............. | 361/166 |
| 2005/0280969 A1 | 12/2005 | Reynolds | | |
| 2008/0019067 A1 * | 1/2008 | Reynolds et al. | ............ | 361/93.1 |
| 2008/0172553 A1 | 7/2008 | Childress | | |
| 2008/0201595 A1 * | 8/2008 | Kawasaki | ...................... | 713/330 |
| 2009/0070611 A1 | 3/2009 | Bower, III et al. | | |
| 2009/0119523 A1 * | 5/2009 | Totten | ........................... | 713/322 |
| 2009/0228726 A1 | 9/2009 | Malik | | |

OTHER PUBLICATIONS

International Search Report dated Feb. 16, 2011.

* cited by examiner

*Primary Examiner* — Sean Shechtman
(74) *Attorney, Agent, or Firm* — Symbus Law Group LLC; Clifford D. Hyra

(57) ABSTRACT

A data center management unit for managing and controlling power distribution to computers in a data center includes a power inlet, a plurality of power outlets for providing power to respective ones of the computers, and a processor. In addition thereto, the data center management unit includes a memory for storing logged parameters or events. The processor in the data center management unit takes measures for disaster prevention and/or disaster recovery based on the logged parameters or events. The measures for disaster prevention or disaster recovery comprise generating alert messages, de-activating one or more power outlets, activating one or more power outlets and/or re-activating a power outlet that has been de-activated earlier.

14 Claims, 1 Drawing Sheet

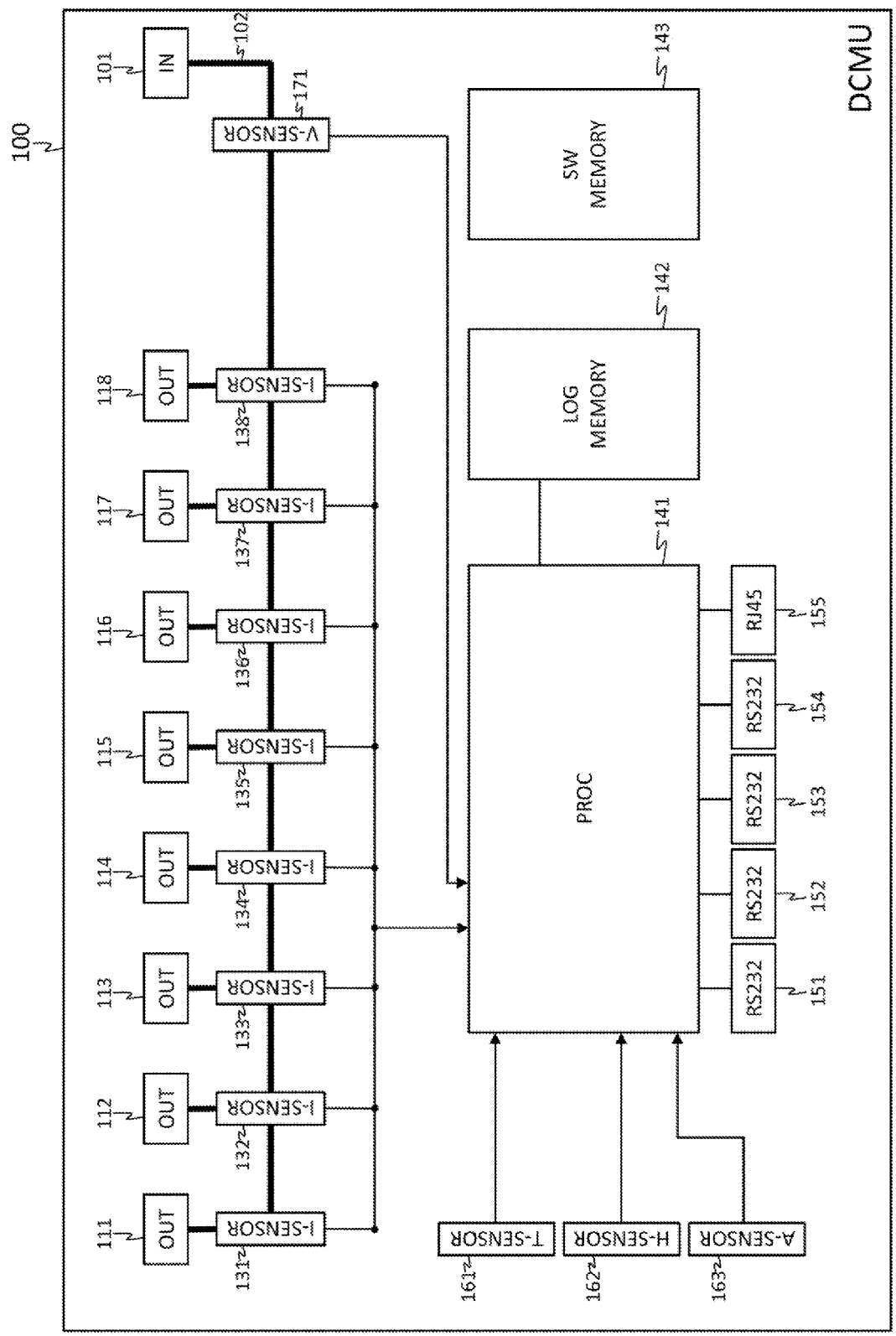

DATA CENTER MANAGEMENT UNIT WITH IMPROVED DISASTER PREVENTION AND RECOVERY

This application claims the benefit of European patent application No. 09075537.2, filed Dec. 3, 2009, which is hereby incorporated by reference in its entirety.

FIELD OF THE INVENTION

The present invention generally relates to power management in data centers and server installations. In particular, the present invention concerns a data center management unit (DCMU) or smart power distribution unit (PDU) with improved prevention of abnormal shutdown events (disaster prevention) and improved recovery from abnormal power shutdown events (disaster recovery) in the data center.

Data centers represent hosting facilities that typically host a few tens up to thousands of computers, e.g. servers, routers, switches, etc. These computers are organized in racks or cabinets. As a result of for instance excessive power consumption, temperature increase in the data center room, short-circuited or defective electronics, etc., plural computers, racks or even an entire data center may be victim of a power shutdown. Such power shutdown represents a disaster for the data center hosting company, its clients and the end users that are left without service during the power interruption. It is of utmost importance for the data center operator that disasters where several computers or racks are affected can be predicted and prevented. In case a disaster has happened, it is key that the data center can recover and become operational fast with isolation of the cause of the disaster to avoid repetitive power shutdowns. In the current patent application, "disaster prevention" denotes the entire set of measures taken to avoid power outages of computers or racks, "disaster recovery" denotes the entire set of measures taken to reboot computers or racks as quickly as possible after a power outage.

BACKGROUND OF THE INVENTION

Power has become one of the most difficult and expensive items to manage in data centers. Up to 40% of data center power supplies are not working optimally. These power supplies consume excessive power resulting in heating, malfunctioning devices, and finally occasional or regular power shutdowns. Networks are out of control after a power failure in the data center and often customers are aware of the data center problem before the data center's operator. In 50% of the cases, the data center operator is informed by the customer on a power shutdown that has occurred in the data center. Moreover, the data center operator typically has difficulties to remote control the switches, airco's, or other electronic devices in the data center. As a consequence, recovery from a disaster where several computers in the data center are affected is slow because intervention by technicians in the data center is required.

As opposed to a dumb power distribution unit (PDU) that has no instrumentation and is not manageable, the present invention concerns a smart power distribution unit or data center management unit (DCMU) that can be metered, is equipped with one or more displays, and can be switched, i.e. individual outlets can be switched on or off remotely. Smart PDUs typically feature means for remote access such as RS-232 serial data ports, external buses such as USB (Universal Serial Bus), or a computer network controller accessible through a network protocol such as Telnet, SSH (Secure Shell), SNMP (Simple Network Management Protocol), ICQ ("I seek you"), or through a web portal. This way, the data center administrator is enabled to access the smart PDU from a remote terminal or interface in order to turn on/off power outlets, to schedule power shutdowns, to control the load, etc.

US Patent Application 2009/0228726 entitled "Environmentally Cognizant Power Management" for instance discloses such a smart PDU—305 in FIG. 3—with real-time electrical metering of consumed power at server level and sensors for environmental parameters such as temperature, humidity and airflow in order to dynamically control the applications and tasks running on the different computers for power usage optimization in the data center.

Although power usage is optimized through load balancing the applications across the computers in the data center, US 2009/0228726 does not teach preventive measures for abnormal power outages, and does not disclose how to safely reboot the data center after a power crash.

US Patent Application 2009/0070611 entitled "Managing Computer Power Consumption in a Data Center", describes a state-of-the-art method for preventing power shutdown disasters in data centers (disaster prevention). In the known method, the aggregate power consumption of a plurality of computers in the data center is monitored and as soon as the aggregate power consumption exceeds a predetermined threshold, certain computers are throttled down in order of priority. As is indicated in paragraph [0013] of US 2009/0070611, the computers are prioritized statically or dynamically in dependence upon applications or tasks running on the computers.

Apart from the fact the method of US 2009/0070611 is executed by a separate power consumption managing computer—152 in FIG. 1—and consequently not integrated in the PDU—120 in FIG. 1—this known method is disadvantageous in that it does not prioritize computers that are critical and likely to cause a power shutdown. The preventive measures taken in US 2009/0070611 in other words may be inadequate.

US Patent Application 2008/0172553 entitled "Data Center Boot Order Control", describes a method for restoration of power supply following a power outage in a data center (disaster recovery). The method involves assigning priorities to the computers in dependence upon financial profit, e.g. billing opportunity, SLA (Service Level Agreement) commitments, financial penalties resulting from server downtime, etc. The priorities are used to determine the reboot order of the computers in the data center.

Just like in US 2009/0070611, the method described in US 2008/0172553 is executed by a power restoration manager server—106 in FIG. 1A—that is not necessarily integrated in the PDU. More worrying however is the fact that a priority in dependence of financial considerations will not isolate critical or defect computers that have caused the abnormal power outage, as a result of which repetitive power shutdowns will be unavoidable.

US Patent Application 2005/0280969 entitled "Current Protection Apparatus and Method" describes a power distribution unit (230 in US 2005/0280969) with circuit breakers per outlet (CB1 ... CB8 in US 2005/0280969), and a processor (236 in US 2005/0280969) that samples the current, compares the current samples to a threshold, and commands the circuit breakers to interrupt the current when the threshold is exceeded, i.e. a so called overcurrent condition. The processor operates under control of software stored on a software memory (238 in US 2005/0280969) and defining the overcurrent conditions at the level of individual outlets.

Although the power distribution unit known from US 2005/0280969 provides some form of disaster prevention through overcurrent detection and circuit breaking, the proposed mechanism overreacts on every overcurrent event resulting in many unnecessary power interruptions.

In summary, existing smart PDUs do not adequately prevent disaster situations where plural computers, racks or the entire data center are affected by a power shutdown. The prior art PDUs also do not have the intelligence to fast and safely restart the computers after a disastrous power outage in the data center. On the contrary, the existing solutions driven by financial profit and/or criticality of the applications run by the different computers most likely prioritize continued powering of those computers in the data center that consume excessive power and are likely to cause/have caused the power outage.

It is an objective of the present invention to disclose a smart PDU or data center management unit (DCMU) that overcomes the above identified shortcomings of existing PDUs. In particular, it is an objective of the present invention to disclose a DCMU with improved disaster prevention/disaster recovery capabilities, i.e. with the ability to isolate the computer(s) that have caused the power shutdown or are likely to cause a power failure in the near future, and with the ability to fast and safely reboot after a power crash, thereby minimizing the risk for repetitive power outages.

SUMMARY OF THE INVENTION

The above identified shortcomings of the prior art are resolved through a data center management unit (DCMU), comprising a power inlet, a plurality of power outlets for providing power to respective ones of the computers, a processor, and memory means for storing one or more logged parameters or events, the processor being adapted to take measures for disaster prevention and/or disaster recovery based on the logged parameters or events, the measures for disaster prevention or disaster recovery comprising one or more of the following:
  generating alert messages;
  de-activating one or more power outlets;
  activating one or more power outlets; and
  re-activating a power outlet that has been de-activated earlier.

Indeed, in comparison with existing smart PDU devices, the DCMU according to the present invention logs parameters or events (or both) in time. The parameter values may be measured in the DCMU, such as the overall power consumption, the power consumption (in kWh) per outlet, the voltage, the current per outlet, the power factor per outlet, the leakage current per outlet, or may be measured by sensors located in the data center, such as the temperature, the humidity, the airflow, etc. Events may be the number of times, the moments in time, or the time intervals during which a certain situation takes place. Examples of such situations are the crossing of a threshold (upper limit or lower limit) for the overall power consumption, the crossing of a threshold for the power consumption per outlet, the crossing of a threshold for the leakage current per outlet, the crossing of a lower or upper temperature threshold, etc. Logging the parameters or events (or both) and analysis thereof by the DCMU's processor enables to detect abnormalities and to pro-actively shutdown the power outlets where such abnormalities are detected in order to avoid disastrous power outages in the data center (disaster prevention) or to exclude power outlets from rebooting where such abnormalities have been detected after a power failure has taken place (disaster recovery). This way, servers or computers that are likely to cause a power failure in the near future are preventively taken out of operation. Similarly, servers or computers that are likely to have caused a power failure are excluded when rebooting the data center to reduce the risk for repeated power outages. As an alternative to switching off certain power outlets, the disaster prevention measures or disaster recovery measures may consist in generating and sending alert messages, controlling hardware in the data center such as ventilation, airco's, heating, etc.

Hence, the processor in the DCMU according to the present invention may generate and send warning messages like an automated e-mail to the user or data center operator, or an SNMP (Simple Network Management Protocol) event to the monitoring server, or other. This way, the system administrator or user will be informed on the abnormality without awaiting the instant where for instance the monitoring server would check the server via the PDU/DCMU and come across the defect or problem. Alternatively, the processor may immediately take action by de-activating certain power outlets, activating certain power outlets in case of rebooting, or re-activating certain de-activated power outlets in case the overall power has decreased again to a level where re-activation of a power outlet is acceptable.

In addition to a data center management unit (DCMU), the current invention applies to a corresponding method for managing and controlling power distribution towards computers in a data center via a data center management unit (DCMU) comprising a power inlet, a plurality of power outlets and a processor, the method comprising storing one or more logged parameters or events; and taking measures for disaster prevention and/or disaster recovery based on the logged parameters or events, the measures for disaster prevention or disaster recovery comprising one or more of the following:
  generating alert messages;
  de-activating one or more power outlets;
  activating one or more power outlets; and
  re-activating a power outlet that has been de-activated earlier.

Optionally, the processor in the data center management unit (DCMU) according the present invention is adapted to analyse changes in time of the logged parameters or events.

When analysing trends, i.e. changes in time of parameters values such as overall power consumption, individual power consumption per outlet, or environmental parameters such as temperature, humidity, airflow, or their respective correlations, the processor in the data center management unit according to the invention will be able to predict power outages and prevent them through controlling the status of power outlets or hardware in the data center, or through alert messages.

Further optionally, the analysis of changes in time may comprise comparing short term values, logged for a short term between zero and fifteen minutes, and long term values, logged for a long term being 1 day or more, of the logged parameters or events.

Indeed, when short term values of a parameter such as the individual power consumption per outlet are compared with the long term average value(s) of that parameter, abnormal or excessive deviations from the average value will be detected and may help the processor to take preventive measures such as alerting the data center operator or switching off an individual power outlet of the DCMU.

According to another optional aspect, the data center management unit may comprise means for detecting micro-interruptions in power, measuring durations of the micro-interruptions, and measuring phase shifts in relation to such micro-interruptions.

When a shift in phase is noticed in relation to a micro-interruption, the cause of the micro-interruptions is a switching from one phase to another in a multi-phase power system. This may for instance happen in systems with STS (Static Transfer Switch), ATS (Automatic Transfer Switch) or a power source switch at rack level. Such micro-interruptions in power may thus result from a switching from one phase to another in a multi-phase power system, or may result from a short interruption in UPS (Uninterruptable Power Supply) or other equipment. The micro-interruptions typically vary in length from a few microseconds up to a few tens of milliseconds. Their duration in time may be measured and also the resulting phase shift may be measured. Certain servers survive such micro-interruptions, others don't survive. As a consequence, it is advantageous to detect and optionally even log the occurrence, duration and resulting phase shift of these micro-interruptions. When the frequency of occurrence, duration or phase shift exceeds certain thresholds, action may be taken such as the sending of alerts, the opening/closing of certain ports, etc. The measurement of the phase shift may help to determine between which phases of the multi-phase power system a switch took place.

Also optionally, the data center management unit (DCMU) according to the present invention may comprise:

power metering circuitry for measuring overall power consumption at the power inlet; and the processor may be adapted to apply a first priority scheme for de-activating power outlets out of said plurality of power outlets in a first priority order whenever the overall power consumption exceeds an overall threshold.

Thus, as part of the disaster prevention measures, the DCMU according to the present invention may monitor the overall power consumption and preventively switch off certain outlets as soon as the overall power consumption exceeds an overall threshold (eventually by a certain percentage and for a certain period of time to avoid that servers will be shutdown as a consequence of an incidental small peak in the overall power consumption that exceeds the threshold). To determine the order wherein servers will be switched off, the DCMU according to the present invention will use the logged parameters or events, and eventual results of trends analysis thereupon.

Further optionally, the first priority scheme may be based on comparison of long term values, logged for a long term being 1 day or more, and short term values, logged for a short term between zero and fifteen minutes, of the logged parameter values or events; and in case of equal priority a power outlet which is more recently activated may be prioritized for de-activation.

Thus, the servers will be prioritized for de-activation in dependence on the deviation of their short term behaviour versus their long term behaviour. A server with a sudden increase in power consumption shall consequently be prioritized for de-activation at a point in time where the overall power consumption exceeds a predefined threshold. When it is impossible for the processor to distinguish between servers on the basis of a comparison of their short term and long term behaviour, the servers that were most recently switched on will be taken out of operation first in an attempt to reduce the overall power consumption below the predefined threshold.

According to another optional aspect of the present invention the processor may be adapted to apply a second priority scheme for re-activating power outlets out of the plurality of power outlets in a second priority order after a power outage. This optional aspect may further take into account start-up parameter values memorized in a start-up log memory during an earlier start-up of the servers. The start-up logging will be discussed in more detail later in this patent application.

Thus, as part of the disaster recovery measures, the DCMU according to the present invention may determine the order wherein the servers or computers will be re-booted. The DCMU shall thereto use the logged parameters and events to prioritize the servers and shall exclude servers that have caused the power outage from rebooting. Optionally, when start-up parameter values are logged, these values may also be used to set the priority order for rebooting and to set delays for rebooting servers such that for instance the overall current limit is not exceeded.

Further optionally, the second priority scheme may be based on comparison of long term values, logged for a long term being 1 day or more, and short term values, logged for a short term between zero and fifteen minutes, of the parameters or events.

Indeed, also the priority for rebooting servers after a power outage may be determined in dependence of the comparison between the short term and long term behaviour of the servers.

It is noticed that short term within the meaning of the present invention may be any period of time between zero and fifteen minutes, whereas long term may be any period of 1 day or more. Evidently, the accuracy in disaster prevention and disaster recovery shall increase with the amount of samples involved, but the memory requirements and processing time for analysing the samples shall increase accordingly. The designer of the DCMU shall determine the short term and long term lengths in function of this trade-off.

Yet another option of the data center management unit (DCMU) according to the present invention, is that the processor may be adapted to de-activate a power outlet of the plurality of power outlets whenever a power measurement for said power outlet exceeds a predetermined per-outlet threshold.

Indeed, when the power consumption of an individual server or computer exceeds a certain per-outlet threshold, the processor may irrespective of the logged values and trends analysis, immediately take preventive measures such as switching off the outlet or alerting the data center operator.

Optionally, the data center management unit according to the invention further comprises memory means for storing one or more parameter values during start-up of a computer out of said computers.

Thus, the DCMU according to the invention may perform start-up logging for servers by memorizing for instance the current increase during the first 5 minutes from start-up of the corresponding server. At start-up, the server will typically consume maximal power because processors are running at 100%, ventilation and hard disks are running at 100%, etc. The parameter values that are logged at start-up are useful for disaster prevention and disaster recovery later on as will be explained in the following paragraphs.

In an embodiment of the data center management unit according to the invention having the start-up log function, the processor may be adapted to determine sequence and timing of re-starting the computers after a power disaster based on the parameter values measured during start-up of the computers.

Indeed, since the start-up behaviour of servers is known as a result of the start-up logging, this start-up behaviour of servers can be used to set the order wherein servers will be allowed to re-start after a power outage, and to determine and eventual time delays to be applied in re-starting the servers in order to avoid that the overall current (or other parameters) exceed thresholds.

Further optionally, the processor may be adapted to instruct deactivation of a computer or alerting when parameter values measured during operation of the computer approach the parameter values measured during start-up of that computer within predetermined limits.

Thus, the start-up logging may also be useful in disaster prevention, since a server whose start-up behaviour is known can be switched off as soon as certain parameters reach during normal operation a value that is calculated from the start-up values. The value may for instance be the maximum reached during start-up, the start-up maximum+10%, the start-up maximum−20%, etc.

Optionally, the data center management unit according to the present invention may comprise memory means for storing the frequency spectrum of current and voltage measured at a power outlet of the plurality of power outlets.

The frequency spectrum of the current, in particular the presence and level of harmonics, contains useful information for predicting power threats and failures.

Consequently, in an embodiment of the data center management unit according to the invention having the frequency spectrum log function, the processor may be adapted to analyse harmonics in the frequency spectrum for threat and failure prediction.

The logged parameters or events may comprise one or more of the following:
- the temperature in the data center, sensed by one or more temperature sensors in the data center room and communicated to the DCMU via wired or wireless technology;
- the humidity in the data center, sensed by one or more humidity sensors in the data center room and communicated to the DCMU via wired or wireless technology;
- the airflow in the data center sensed by one or more airflow sensors in the data center room and communicated to the DCMU via wired or wireless technology;
- the current measured at a power outlet of the plurality of power outlets, sensed by a current sensor in the DCMU;
- the total harmonic distortion or THD;
- the power factor of a plurality of the power outlets;
- the voltage measured at a power inlet;
- the energy consumed by a power outlet of the plurality of power outlets;
- the power consumed by a power outlet of the plurality of power outlets;
- the leakage current measured at a power outlet of the plurality of power outlets;
- short circuit events.

Whereas the energy is expressed in kiloWatt hours (kWh), the power is expressed as an amount of Watts (W).

BRIEF DESCRIPTION OF THE DRAWINGS

FIG. 1 is a functional block scheme of an embodiment of the data center management unit (DCMU) according to the present invention.

DETAILED DESCRIPTION OF EMBODIMENT(S)

FIG. 1 shows a data center management unit, DCMU or 100. The DCMU has a single power inlet, IN or 101, eight power outlets, OUT or 111, 112, 113, 114, 115, 116, 117 and 118, a processor, PROC or 141, a memory, LOG MEMORY or 142, a second memory, SW MEMORY or 143, four RS232 ports, 151, 152, 153, 154, and an RJ45 connector 155. The second memory 143 stores the firmware, i.e. software programs and settings to control the hardware, comparable to the software memory known from prior art document US 2005/0280969 cited here above. The RS232 ports 151, 152, 153, 154, and the RJ45 connector 155 are connected to the processor 141. Each of the power outlets 111, 112, 113, 114, 115, 116, 117 and 118 is equipped with a current sensor, respectively denoted by I-SENOR or 131, 132, 133, 134, 135, 136, 137 and 138. The current sensors 131, 132, 133, 134, 135, 136, 137 and 138 are connected to an input of the processor 141. At the power inlet 101, the DCMU 100 is equipped with a voltage sensor, V-SENSOR or 171, placed in the power distribution wiring 102. The latter power distribution wiring 102, represented by a bold, black line in FIG. 1, couples the power outlets 111, 112, 113, 114, 115, 116, 117 and 118 to the power inlet 101 via respective switch-on/switch-off circuits, not drawn in FIG. 1. FIG. 1 further shows connectors for a temperature sensor, T-SENSOR or 161, a humidity sensor, H-SENSOR or 162 and an airflow sensor, A-SENSOR or 163. These sensors are supposed to be placed in the data center and are connected via wires to the connectors 161, 162 and 163 of the DCMU, or alternatively communicate wirelessly with the DCMU. The connectors 161, 162 and 163 serve as inputs for the processor 141.

The DCMU 100 drawn in FIG. 1 can distribute power to at most eight connected devices. The power inlets of these eight devices, e.g. servers in a rack of a data center, thereto are connected to the power outlets 111, 112, 113, 114, 115, 116, 117 and 118 of the DCMU 100. By controlling the switch-on/switch-off circuits, the processor 141 controls the distribution of power to the servers connected to the outlets 111, 112, 113, 114, 115, 116, 117 and 118. When the power outlet 111 is switched off, the server connected to power outlet 111 is de-activated. When the power outlet 111 is switched on, the server connected to the power outlet 111 is activated. The current sensor 131 then measures the current delivered via outlet 111 in real-time. The current sensor 131 thereto samples the current 400 times per cycle, i.e. at a sampling rate of 400×50 Hz or 20.000 samples per second.

The DCMU 100 is remotely configurable and controllable via a network, e.g. the Internet. Via remote management, certain power outlets can be switched on/off, rebooting servers can be scheduled, certain ports on servers, routers, switches can be turned off/on, etc. by the data center operator without disposing a technician to the data center. The network connectivity is realized through the RJ45 Ethernet connector 155 drawn in FIG. 1. Typically, this RJ45 connector will be connected via one or more firewalls and/or routers to the Internet or an Intranet, and enable the data center operator to remotely manage and control the power distribution from a PC with network connectivity. The DCMU 100 in FIG. 1 further features four RS232 serial data ports 151, 152, 153 and 154 for connectivity with the computers, servers, routers, etc. in the data center. These serial ports can be used to directly control various hardware functions, like switching on/off relays, ports, ventilation, heating, temperature sensors, etc. It is noticed that various alternatives exist for RS232 (Recommended Standard 232) like for instance IPMI (Intelligent Platform Management Interface), USB (Universal Serial Bus), I²C (Inter-Integrated Circuit), SPI (Serial Peripheral Interface), etc.

The log memory 142 logs the values of different parameters and the occurrence of certain events. In the DCMU of FIG. 1, the voltage sensed by voltage sensor 171 is logged, and the current delivered to the different outlets and sensed by the current sensors 131, 132, 133, 134, 135, 136, 137 and 138, is also logged. Voltage and current per outlet are sampled at a sampling rate of 20.000 samples per second (50 Hz×400 samples per cycle period). The memory 142 logs the values over a time period of 7 days. The samples themselves may be memorized, or values calculated from for instance 1000 successive samples may be memorized in order to reduce the memory requirements. In addition to the voltage and current per outlet, memory 142 logs environmental parameters such as temperature, humidity and airflow. These parameters are sensed by sensors located at various places in the data center. The sensed temperature, humidity and airflow are regularly reported to the processor 141 via respective interfaces 161, 162 and 163, and the processor 141 stores the values in memory 142. The processor also maintains a number of predetermined or configurable thresholds, like an upper and lower threshold for the overall power consumption, an upper and lower threshold for the individual power consumption per outlet, upper and lower bounds for the temperature, humidity and airflow. Exceeding such a threshold (eventually by a certain percentage and/or for a certain period of time) represents an event that is also logged by the memory 142. The memory 142 can be implemented as RAM, ROM, or a combination of both like for instance a fast small FRAM for short term logging and a slow big EEPROM for long term logging. Further separate memory locations may be foreseen for start-up logging, i.e. the logging of certain parameters during the first few minutes after start-up of a server, and for logging the current's frequency spectrum for threat and failure analysis. The memory 142 can be equipped with a timer.

The processor 141 in DCMU 100 performs trends analysis on the parameter values and events logged in memory 142. The processor 141 is a 10 MHz processor that is fully programmed in C and Assembler such that no operating system is required. An advantage thereof is that the processor is highly efficient with a low power consumption—2 Watt instead of 50 Watt consumed by traditional PDUs—thanks to its low clock speed. The processor 141 may be implemented as two cooperating processors, for instance one processor controlling the power distribution to the outlets, and a second processor dealing with all communication via the RS232 and RJ45 ports. The processor 141 performs trends analysis by comparing short term logged values with long term logged values. The short term values of a parameter are the values logged over the last 10 minutes, whereas the long term values are the values logged over a period of 7 days. At start-up or during operation of a server, the short term values of parameters are compared with long term values or averages, and when the deviation between short term value and long term value is excessive, the processor will take measures for disaster prevention (e.g. alerting the system operator or de-activating the outlet) or measures for disaster recovery (e.g. disallowing the server to become active).

Thanks to the voltage and current sensors that sample the voltage and current per port at a rate of 20.000 samples/second, the processor 141 can perform true root mean square (RMS) power consumption measurements per outlet. In comparison with existing smart PDU devices that make an estimation of the RMS power consumption through calculation, the DCMU 100 hence measures true RMS power consumption per outlet resulting in high accurate knowledge of the power consumption by individual servers in the data center. The comparison of the 10 minute log with the 7 day log of these true RMS power measurements enables the processor 141 to detect abnormalities and to pro-actively shutdown the power outlet where such abnormality has been detected, or to exclude a power outlet from rebooting when such abnormality has been detected after a power failure has taken place.

Similarly, the comparison of the 10 minute log of the temperature of a server with the 7 day log of the temperature of that server may indicate an abnormal rise in temperature. As a consequence of such temperature raise, the processor 141 may send an alert message to the data center operator, who may clear the warning such that no preventive actions are taken or who may alternatively instruct the DCU 100 remotely to switch off or on one or more power outlets.

The processor 141 compares the real-time true RMS power consumption measured for each power outlet, 111, 112, 113, 114, 115, 116, 117 and 118, with a per-outlet power threshold. The per-outlet current threshold is predetermined at 8 A per port but may be configured per outlet. Alternatively, a power threshold may be set. When the measured power consumption exceeds the threshold, the corresponding outlet is switched off via a switch-on/switch-off circuit.

In addition to individual power consumption monitoring, the processor 141 compares the overall power consumption with a threshold in order to take measures for disaster prevention as soon as the overall power consumption exceeds an overall threshold. When the overall power consumption exceeds the overall threshold of e.g. 15 Amperes, the processor will switch off outlets until the overall power consumption has again decreased to a level below the overall threshold. The outlets that will be switched off are selected and prioritized on the basis of trends analysis on the logged parameters and events. As a result, servers whose recent power consumption (or temperature, or leakage current, . . . ) shows a significant discrepancy with its long term average power consumption (or temperature, or leakage current, . . . ) have likely caused the excessive overall power consumption and will therefore be switched off before other servers. Should the short term/long term comparison of logged parameters and events not be able to distinguish between servers, then the server that was switched on most recently, will be switched off first.

In case a rack is down, the logged parameters and events will be used to figure out what device has caused the outage. Instead of starting a step by step procedure to power up machines with several combinations until the machine that caused the outage can be isolated, the processor 141 compares the short term logged parameter values with the long term logged parameter values in order to determine the likeliness that a server has caused the outage. The machines will be prioritized for rebooting in increasing likeliness that they have caused or contributed to the power outage. If the server that has caused the outage is identified, it will be disabled while starting the other servers. Since starting servers typically consume 30 percent more power, the operator can determine a delay on each power outlet such that a power peak causing repetitive outages is avoided.

The best practice in data centers for air conditioning is to deploy raised floors with perforated tiles on hot spots for cooling of the data center. Airflow may be measured at data center level or per row of racks. An airflow sensor measures the airflow in meter per second and reports the measured airflow to the DCMU 100 via interface 163. The memory 142 logs the airflow values over time and the processor 141 performs trends analysis on the logged airflow values to determine evolution e.g. in function of the weekday, the time of the day, the power consumed by the servers, etc. in order to detect unexpected heating and less optimal airflow in certain areas of the data center at a later point in time. Such abnormalities will be reported to the data center operator and preventive measures may be taken such as switching off power outlets for servers located in the problem area, increasing ventilation in the problem area, adapting the airco or heating in the problem area, etc.

Also temperature measurements at several places inside a rack are of utmost importance. Processor 141 will use two threshold levels in relation to the temperature measurements that are reported via interface 161. When a first threshold is reached, an alert will be sent, e.g. through SMTP or SNMP. When a second threshold is reached, machines will be switched off, again taking into account cascading policies where servers that have contributed most to the temperature raise according to the logged parameter values and trends analysis, are powered down first. The policies may be operator-configurable. In general, multiple thresholds may be set and actions such as switching off ports, activating a zoomer or beeper, sending an alert e-mail, SNMP trapping, etc. may be coupled to the crossing of such a threshold.

Power supplies in degradation will not only generate a load on the power but will also damage the power supply itself and eventually cause a power outage. For this reason, the processor 141 also measures the power factor in detail. The power factor is expressed as a percentage. Machines that show a power factor below 70% will be taken actions on. Alerting the data center operator of such fact will for instance result in replacing a malfunctioning power supply.

Optionally, not shown in FIG. 1, the DCMU 100 may be equipped with an end-user portal that can provide access to one or more appliances and retrieves the data relevant for a single end user: data about power consumption, data about temperature, data and action controls on reboot, general health of the hardware of that end user. The data may be provided from the log memory 142 or may be analyzed and processed by the processor 141 before made accessible by the end-user. Such portal may also provide access to the combined data of multiple PDUs or DCMUs, or even to the consolidated data of an entire data center. The latter may be useful for the operator for instance in case switching off a server requires deactivation of ports on multiple DCMUs.

Although the present invention has been illustrated by reference to a specific embodiment in FIG. 1, it will be apparent to those skilled in the art that the invention is not limited to the details of the foregoing illustrative embodiment, and that the present invention may be embodied with various changes and modifications without departing from the scope thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. In particular, the DCMU according to the present invention is not restricted to have a particular number of inlets—there may for instance be more than one power inlet for backup reasons—or a particular number of outlets. The parameters or events logged in the memory may differ from the ones listed here above in relation to the DCMU depicted in FIG. 1. In particular, where one or two thresholds were given as an example, the skilled technician will appreciate that any number of thresholds can be implemented, each coupled to specific actions when crossed. The trends analysis may be any statistical or correlation analysis showing trends or tendencies of parameter evolution in time, and is consequently not limited to the comparison of short term and long term logs. The skilled person will also appreciate that the 10 minute short term interval and the 7 day long term interval were only mentioned as an example, as the invention is not restricted to any particular choice of the length of such intervals. The memory and processor may be integrated in a single component, may be implemented as two separate components, or each of them may be implemented as a plurality of components cooperatively coupled.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A data center management unit for managing and controlling power distribution to computers in a data center, said data center management unit comprising a power inlet, a plurality of power outlets for providing power to respective ones of said computers, and a processor,
    wherein said data center management unit further comprises memory for storing one or more logged parameters or events,
    wherein said processor is able to take measures for disaster prevention to avoid power outages of computers or racks of computers in said data center and/or measures for disaster recovery to reboot computers or racks of computers in said data center after a power outage, said measures for disaster prevention and/or disaster recovery including:
    generating alert messages;
    de-activating one or more power outlets of said plurality of power outlets;
    activating one or more power outlets of said plurality of power outlets; and
    re-activating a power outlet that has been de-activated earlier,
    wherein said processor is adapted to analyse changes in time of values of said logged parameters or events comprising a comparison of short term values, logged for a short term between zero and fifteen minutes, and long term values, logged for a long term being 1 day or more, of said logged parameters or events, and
    wherein said processor is adapted to take one or more of said measures for disaster prevention and/or disaster recovery based on said comparison of short term values and long term values of logged parameters or events.

2. A data center management unit according to claim 1, wherein said data center management unit comprises a mechanism configured for detecting micro-interruptions in power, measuring durations of said micro-interruptions, and measuring phase shifts in relation to such micro-interruptions.

3. A data center management unit according to claim 1, wherein said data center management unit further comprises:
    power metering circuitry for measuring overall power consumption at said power inlet; and wherein
    said processor is adapted to apply a first priority scheme for de-activating power outlets of said plurality of power outlets in a first priority order whenever said overall power consumption exceeds an overall threshold.

4. A data center management unit according to claim 3,
wherein said first priority scheme is based on comparison of long term values, logged for a long term being 1 day or more, and short term values, logged for a short term between zero and fifteen minutes, of said logged parameter values or events; and
wherein in case of equal priority based on said comparison a power outlet which is more recently activated is prioritized for de-activation.

5. A data center management unit according to claim 1, wherein said processor is adapted to apply a second priority scheme for re-activating power outlets out of said plurality of power outlets in a second priority order after a power outage.

6. A data center management unit according to claim 5, wherein said second priority scheme is based on comparison of long term values, logged for a long term being 1 day or more, and short term values, logged for a short term between zero and fifteen minutes, of said logged parameters or events.

7. A data center management unit according to claim 1, wherein said processor is adapted to de-activate a power outlet of said plurality of power outlets whenever a power measurement for said power outlet exceeds a predetermined per-outlet threshold.

8. A data center management unit according to claim 1, said data center management unit further comprising memory for storing one or more parameter values during start-up of a computer out of said computers.

9. A data center management unit according to claim 8, wherein said processor is adapted to determine sequence and timing of re-starting said computers after a power disaster based on said parameter values stored during start-up of said computer.

10. A data center management unit according to claim 8, wherein said processor is adapted to instruct deactivation of a computer or alerting when parameter values measured during operation of said computer approach said parameter values stored during start-up of said computer within predetermined limits.

11. A data center management unit according to claim 1, said data center management unit further comprising memory for storing the frequency spectrum of current and voltage measured at a power outlet of said plurality of power outlets.

12. A data center management unit according to claim 11, wherein said processor is adapted to analyse harmonics in said frequency spectrum for threat and failure prediction.

13. A data center management unit according to claim 1,
wherein said logged parameters or events comprise one or more of the following:
temperature in said data center;
humidity in said data center;
airflow in said data center;
current measured at a power outlet of said plurality of power outlets;
total harmonic distortion or THD;
power factor of a plurality of said power outlets;
voltage measured at said power inlet;
energy consumed by a power outlet of said plurality of power outlets;
power consumed by a power outlet of said plurality of power outlets;
leakage current at a power outlet of said plurality of power outlets;
short circuit events.

14. A method for managing and controlling power distribution towards computers in a data center via a data center management unit comprising a power inlet, a plurality of power outlets and a processor,
wherein said method comprises:
storing one or more logged parameters or events; and
taking measures for disaster prevention to avoid power outages of computers or racks of computers in said data center and/or measures for disaster recovery to reboot computers or racks of computers in said data center after a power outage, said measures for disaster prevention and/or disaster recovery including:
generating alert messages;
de-activating one or more power outlets of said plurality of power outlets;
activating one or more power outlets of said plurality of power outlets; and
re-activating a power outlet that has been de-activated earlier,
wherein said method comprises analysing changes in time of values of said logged parameters or events comprising a comparison of short term values, logged for a short term between zero and fifteen minutes, and long term values, logged for a long term being 1 day or more, of said logged parameters or events,
and wherein said method comprises taking one or more of said measures for disaster prevention and/or disaster recovery based on said comparison of short term values and long term values of said logged parameters or events.

* * * * *